United States Patent [19]
Ames et al.

[11] Patent Number: 5,371,814
[45] Date of Patent: Dec. 6, 1994

[54] PASSIVE, MULTI-CHANNEL FIBER OPTIC ROTARY JOINT ASSEMBLY

[75] Inventors: Gregory H. Ames, Gales Ferry; Roger L. Morency, Voluntown, both of Conn.

[73] Assignee: The United States of America as represented by the Secretary of the Navy, Washington, D.C.

[21] Appl. No.: 151,396

[22] Filed: Nov. 8, 1993

[51] Int. Cl.$^5$ ............................................. G02B 6/32
[52] U.S. Cl. ......................................... 385/25; 385/26
[58] Field of Search ...................................... 385/25, 26

[56] References Cited
U.S. PATENT DOCUMENTS

| | | | |
|---|---|---|---|
| 4,109,998 | 8/1978 | Iverson | 385/26 |
| 4,258,976 | 3/1981 | Scott et al. | 385/26 |
| 4,943,137 | 7/1990 | Speer | 385/26 |
| 5,157,745 | 10/1992 | Ames | 385/26 |
| 5,271,076 | 12/1993 | Ames | 385/26 |

*Primary Examiner*—John D. Lee
*Attorney, Agent, or Firm*—Michael J. McGowan; Prithvi C. Lall; Michael F. Oglo

[57] ABSTRACT

A passive multi-channel optical fiber rotary joint couples optical fiber communication channels via axially bilaterally symmetrically disposed lens housings, or array pieces, for receiving miniature-collimation-lenses to one and the other sides of an image-derotation-prism-and-prism-rotational-drive-subassembly including an image derotation prism which rotates at a predetermined ratio of the relative rotation of the array pieces. This establishes transverse pseudo-planar rotary interfaces respectively between the one and another array piece and the confronting sides of the prism-and-prism-drive-subassembly. Each channel, at the axially outward side of each of one and the other array pieces, includes a fiber and lens junction in which the fiber is attached to the axially outward side of the collimation lens at (i) a predetermined axially bilaterally symmetrical position chosen for maximum coupling of signal power through the joint, and (ii) individual lateral positions relative to the lens chosen to provide coupling with a path of beam propagation perpendicular to the rotary interface at the other side of the collimation lens. Each array piece forms a precision tolerances locality of axial engagement with the confronting side of the prism-and-prism-drive-subassembly, which in turn defines the respective rotary interfaces.

15 Claims, 4 Drawing Sheets

PASSIVE, MULTI-CHANNEL FIBER OPTIC ROTARY JOINT ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The instant invention is directed to an improved optical trains alignment of optical fiber communication channels in a rotary joint assembly, and more particularly, to such an assembly which enables the propagation of signals on multiple, single-mode or multi-mode, optical fiber channels across a continuous rotary interface with low loss, low crosstalk between channels, and low reflection of light back into the input fibers.

(2) Description of the Prior Art

The apparatus of the present invention especially satisfies a requirement arising in connection with multiple channel optical fiber rotary joints. Multiple channel rotary joints for multi-mode fibers have been developed but exhibit high optical loss and variation of loss with rotation. Additionally, the extreme tolerances associated with single-mode fibers preclude the easy adaptation of rotary joints to handle single-mode fiber. The tight tolerances required by single-mode fibers generally result in excessive loss or excessive variation of loss with rotation. Rotary joints for single-mode fiber have been developed, but are limited to a single on-axis fiber. There are devices which actively align the output fibers to track the input fibers, but these are complicated, require electrical power, and do not allow operation in both directions.

Another type of rotary joint, which is a predecessor to the present invention, is exemplified by U.S. Pat. 4,109,998 to Iverson. The Iverson rotary joint utilizes a derotation optical element such as a dove prism to derotate the images of an input set of optical transmitters located on the rotor, so that they may be focused onto stationary photo detectors located on the stator. Derotation is accomplished by gearing the rotor and the prism in such a way that the prism rotates half as fast as the rotor. The Iverson optical rotary joint does not utilize optical fiber, but rather light emitting diodes (LEDS) or lasers and laser detectors. As a result, it does not require the high alignment accuracy required for optical fibers, because the detectors may be quite large. The device is not bidirectional. Because of the relatively large size of the detectors, they will be limited in bandwidth to well below the bandwidth capability of the optical fiber. Several design features preclude its adaptation to optical fiber. The lenses which focus light from input to output are large lenses located on the prism rotor on either side of the prism. While acceptable for the relatively crude alignment of LEDs and the type of detectors disclosed in the Iverson patent, this would be a precluding factor for purposes of an optical fiber application by reason of the latter's requirement to maintain ultra-tight lateral and angular tolerances between rotor, prism rotor and stator. Additionally, some channels are necessarily off the lens axis, leading to unacceptable aberrations in coupling a plurality of optical fibers. In general, because it was not required, the Iverson patent contains no teaching regarding associated mechanical means of meeting and maintaining the critical alignment tolerances imposed by optical fiber.

Typically in the heretofore known rotary joints for multi-mode fibers, ferrule-encased-optical-fiber-terminations were simply mechanically inserted into lens holders for cylindrically-bodied-miniature-collimation-lenses with the encased-fiber-terminations simply concentrically aligned with the respective one of the collimation lenses.

SUMMARY OF THE INVENTION

Accordingly, the objectives of the invention include the provision of an improved optical fiber communication channels rotary joint assembly having lower loss, crosstalk and reflection of light back into the input fibers than heretofore obtainable with the prior art.

The objectives further include provision of such an assembly which is capable of utility for single or multiple channel applications, and which is capable of utility for applications employing single-mode or multiple-mode optical fibers.

In accordance with the objectives of the present invention, a passive multi-channel fiber optic rotary joint is disclosed by which a large number of fibers, whether multi-mode or single-mode, and corresponding signals, may be passed limited only by the available volume envelope for the physical elements of the joint. Light may travel in either direction through the joint and the joint may be rotated continuously in either angular direction about its axis of rotation. In accordance with the present invention, there are provided a pair of lens array housing members (which may sometimes hereinafter and in the claims be referred to as "array pieces" or "end subassemblies"). These array pieces have as their function the support of one or more cylindrically-bodied-miniature-collimation-lenses of a type conventionally employed in optical fiber apparatuses. In such applications the miniature-collimation-lenses have joined to their lenses faces at one side of the array a corresponding one or more ferrule-encased-optical-fiber-terminations. A first such array is fixedly mounted to a stator, and a second such array or end subassembly is mounted for rotation with respect to the stator. An image-derotation-prism-and-prism-rotational-drive-subassembly is mounted for rotation between the first and second arrays. The rotating second array and the rotating image de-rotating prism rotate relatively to each other about a axis of rotation at a preselected rotation ratio relative to each other. The prism-and-drive subassembly serves to derotate optical propagation paths across one and the other of a pair of transverse rotary interfaces respectively between the first array and the prism-and-drive subassembly, and between the prism-and-drive subassembly and the second array. At each of the first and second arrays, the encased-fiber-terminations are butt ended into the adjoining face of its respective associated miniature-collimation-lens and made fast thereto by a suitable fiber optic beam transmissive adhesive medium to form a strong and durable joint (or junction) when it hardens. The ferrule which encases the fiber termination may be of glass, ceramic or other equivalent material.

The end face of each ferrule-encased-optical-fiber-termination is longitudinally disposed at a preselected single-coordinate location along a linear axis co-parallel with the central axis of the associated cylindrically-bodied-miniature-collimation-lens and the axis of rotation of the rotary assembly. This single-coordinate location is behind (i.e., relative to the direction of a beam propagating from the fiber to the lens) of the focal point. (Stated in terms of the rotary joint axis of rotation, the direction of the single coordinate location from the focal point of the lens is axially outwardly beyond the focal point, with the origin of such axis defined to be at the optical midpoint of the optical train of which the joint is part, namely somewhere in the prism of the image-derotation-prism-and-prism-rotational-drive-subassembly. In one embodiment that preselected location is at the end face of the lens, the lens having been processed by being polished to reduce its length from a pre-processed deliberately excessive length to a decreased re-sized length at which the aforesaid preselected axial location coincides with the lens face of the post-processed lens. In this embodiment the ferrule-encased-fiber-termination butts against the lens face. The arrangement of encased-fiber-terminations and lenses in the first and second array are in mirror image relation to one another, and the aforesaid preselected single-coordinate longitudinal (or axial) locations of the end faces of the encased-fiber-terminations relative to the focal points of the lenses are chosen to provide coupling of a maximum amount of optical power through the optical train of the rotary joint assembly, which includes the axially opposite mirror image arranged miniature collimation lenses and the intervening prism in the prism-and-drive-subassembly. Each ferrule-encased-optical-fiber-termination is laterally (or stated, in relation to the axis of rotation, radially and azimuthally) disposed in relation to the disposition of the adjoining respective cylindrically bodied miniature collimation lens such that the central axis of the encased-fiber-termination will pass through a preselected two-coordinate location in a transverse reference plane. (Note that it would be equivalent to state that the lateral disposition of the encased-fiber-termination is relative to the position of the end face of the miniature-collimation-lens, including possible dispositions in which the encased-fiber-termination abuts). The aforesaid reference plane may be regarded as transverse to each of (i) the central linear axes of the encased-fiber-terminations, (ii) the optical axes of the miniature-collimation-lenses, and (iii) the axis of rotation of the rotary joint assembly; all of which axes are co-parallel. The reference plane may be regarded as passing through the end face of the ferrule encased fiber termination. The preselected two-coordinate location for each fiber termination is chosen such that a beam path in an optical fiber couples with a "nearly collimated" (this nuance will be amplified upon in the detailed description of the preferred embodiment hereinafter) beam path emerging at the opposite side of the miniature-collimation-lens. The beam path is normal to the one and the other of the pair of transverse rotary interfaces respectively between the first array and the prism-and-drive-subassembly and between the second array and the prism-and-drive-subassembly. Note that the diameter of a beam (i.e., beam aperture) as it passes through a miniature-collimation-lens is larger than the diameter of the same beam as it passes through the fiber in the encased-fiber-termination.

The first and second rotary interfaces are each implemented by a circular-race and roller ball type thrust bearing. It will be appreciated that this configuration does not strictly provide a planar rotary interface and hence is sometimes in this specification and append claims referred to as a "pseudo-planar rotary interface".

However, as a generality this configuration provides a rotary interface which operates transversely relative to the axis of rotation. It will also be appreciated that at least a part of the circular-race roller ball type thrust bearing provides a locality of axial engagement which defines a transverse reference plane that is employed in the aforesaid lateral positioning of each ferrule- encased-optical-fiber-termination relative to the respective associated cylindrically-bodied-miniature-collimation-lens. (Further to what has been discussed earlier regarding geometric relationships relative to axis of rotation, this locality of axial engagement provides the instrumentality to align the lateral relationship between the encased-fiber-termination and its associated miniature-collimation-lens.) The aforesaid preselected rotation ratio is implemented by a planetary gearing system which provides a relative 2:1 rotation ratio. The passive multi-channel fiber optic rotary joint exhibits low loss and low crosstalk and is capable of implementing (i) single or multiple channel applications; (ii) single-mode or multiple-mode optical fiber applications; and (iii) forming a joint for any number of optical fibers limited only by the available volume envelope for the first array piece, the second array piece, and the derotation-prism-and-drive-subassembly.

BRIEF DESCRIPTION OF THE DRAWINGS

Other objects, features, and advantages of the present invention will become apparent as the invention becomes better understood by referring to the following detailed description of the illustrative embodiments thereof, and to the drawings, wherein.

DETAILED DESCRIPTION OF THE PREFERRED EMBODIMENTS

Figure 1:
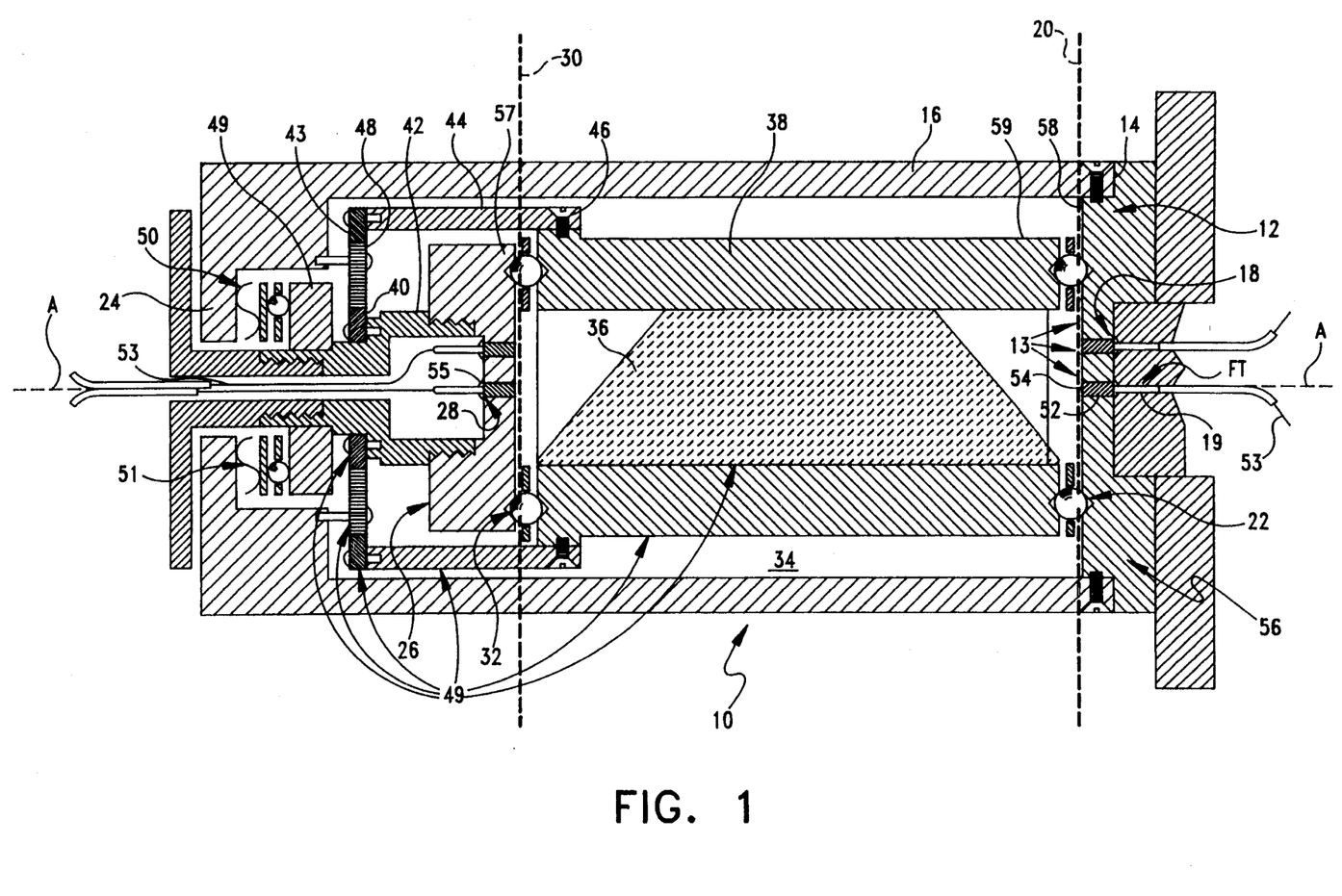
FIG. 1 is a longitudinal sectional view of a multiple optical fiber rotary joint assembly in accordance with the present invention.
Figure 2:
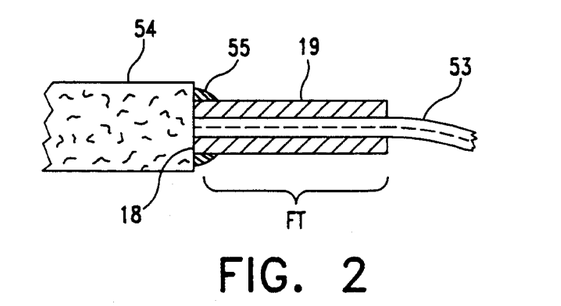
FIG. 2 is an enlargement of one of the regions of a joint between a ceramic ferrule-encased-optical-fiber-termination and a cylindrically-bodied-miniature-collimation-lens in FIG. 1.

Referring now to FIG. 1, generally designated at 10 is a longitudinal sectional view illustrative of an embodiment of a multiple channel optical fiber rotary joint assembly in accordance with the present invention. Rotary joint assembly 10 includes a first stationary array piece, or cylindrically-bodied-miniature-collimation-lens receiving member, generally designated 12. Array piece 12 is fastened, as by threaded members 14, to one end of a cylindrical stator member 16. The function of array piece 12 is to hold and support one or more adhesively-held-together fiber and lens joints, generally designated 18. As may be best seen in FIG. 2, joint 18 is formed between a ceramic ferrule- encased-optical-fiber-terminations FT and a cylindrically bodied miniature collimation lens (designated by reference numeral 54 and more specifically discussed in the more detailed description of joint 18 later herein). The composite unit of array piece 12, and the joints 18 which it supports constitute a fiber and lenses interconnection subassembly 13. The ferrule 19, which encases the fiber termination may be made of glass, ceramic or other equivalent material. Array piece 12 contains one such joint 18 for each fiber optical communication channel coupled by rotary joint assembly 10. More specific details concerning the ferrule-encased-optical-fiber-termination FT and concerning the cylindrical-bodied-miniature-collimation lens will be described later herein. The present section of this specification emphasizes the spatial relationship of the adhesively-held-together joints, or junctions, 18 to a first pseudo-planar transverse rotary interface (or simply planar transverse rotary interface) schematically illustrated by dashed line 20 of FIG. 1. There is relative rotation between components of rotary joint assembly 10, about an axis of rotation A. For purposes of description of assembly 10, Axis A is deemed to have an origin (unmarked in the drawings) at the midpoint (in terms of optical lengths) of the optical trains through rotary joint assembly 10. (As will become apparent later herein, this places the origin of Axis A generally at the middle of an image derotation prism designated by reference numeral 36 in the description and image-derotation-prism-and-drive-subassembly 49, later herein). Relative motion takes place across transverse rotary interface 20 between array piece 12 and the parts of rotary joint assembly 10 disposed in the axially inward (i.e., toward the origin of the Axis) direction therefrom. Optical beams (not shown) consisting of optical fiber signal beams transformed into nearly collimated beams (this nuance of being "nearly collimated" will be explained later herein) by the miniature-collimation-lenses of fiber and lens joints 18 propagate across transverse planar rotary interface 20 along beam paths perpendicular to such planar transverse rotary interface.

In the embodiment illustrated in FIG. 1, first planar transverse rotary interface 20 is constituted by a roller ball and V-groove circular race thrust bearing assembly (more generically termed a circular-race and roller ball type thrust bearing) generally designated 22 that permits continuous 360° rotation of the structures engaging one another across interface 20 with very low frictional resistance to relative rotation. It is to be appreciated that other constructions which would implement a transverse rotary interface with tight dimensional tolerances, but with very low frictional resistance to relative rotation, could be substituted for that described above without departing from the scope of the instant invention. It will also be appreciated that constituting a rotary interface by means of a circular-race and roller ball thrust bearing does not nicely geometrically define the planar interface indicated by dashed line 20. However, as a generalization this configuration does provide a rotary interface which operates as a virtual transverse-planar-rotary interface relative to the axis of rotation, and hence the term "pseudo planar" transverse rotary interface" is apropos. One may optionally define this planar interface as one tangent to the roller balls or one passing through the center of the roller balls.

A flange 24 is formed at the other end of the cylindrical stator 16 spaced from and confronting the first stationary array piece 12 (affixed to stator 16) against which a second rotating array piece (or fiber and lens interconnection subassembly) generally designated 26 is rotatably mounted in a manner to be described. The function of second rotating array piece 26 is to hold and support a like set to adhesively-held-together fiber and lens joints which are generally designated 28. In the axially inward direction from array piece 26, there is a second rotary interface 30. Second rotary interface 30 is constituted by a like roller ball and V-groove and thrust bearing assembly generally designated 32, to permit continuous 360° rotation of the structure engaging the axially inward side of assembly 49. Array pieces 12, 26 may sometimes in this specification and the appended claims be referred to as "end subassemblies" or "array members".

For purposes of more clearly depicting the underlying concepts, the drawings depart from literal design detail and do not show a fiber and lens joint central disposed in array pieces 12, 26. However, it is to be appreciated that actually array pieces are usually designed to hold and support the individual fiber and lens joints of sets 18, 28 in a pattern in which one fiber and lens joint is aligned along Axis A and the other fiber and lens joints are located at equiangularly spaced positions thereabout in a transverse plane. These positions are paired with matching, angular positions of the set associated with the other array piece. The correspondingly positioned pairs of fiber and lens joints of sets 18, 28 in one and the other array pieces 12 and 26 implement coupling for a plurality of fiber optical communication channels.

In the innerspace generally designated 34 defined between the first and second array pieces 12 and 26, a derotation prism 36 is carried by a prism rotor 38 that is mounted for rotation on the roller bearing and V-groove assemblies 22 and 32. It will be appreciated that assemblies 22 and 32 define planar transverse rotary interfaces 20 and 30. The prism 36 preferably is a Dove prism, although other suitable image de-rotating prisms such as a Pechaun prism or other optical elements may be employed as well.

A star gear 40 is mounted for rotation with the second rotating array piece 26 via annular member 42 threadably fastened thereto, and an internal ring gear 43 is mounted for rotation with the prism rotor 38 via annular sleeve 44 attached to the prism rotor 38 as by threaded members 46. A plurality of planetary gears 48, which are rotatably supported by shafts extending from the flange 24 of stator 16, are mounted between and in mechanically ganged relation to both the star gear 40 and internal ring gear 43. A flange 49 is mounted for rotation with annular member 42 threadably fastened to the second rotating array piece 26, and a thrust bearing assembly generally designated at 50, which is resiliently biased by a spring 51, is provided between and abutting the flange 24 of the stator 16 and the flange 49 mounted to annular member 42. In the preferred embodiment, the planetary gears 40, 43, 48 provide rotation of the second rotating array piece 26 relative to the rotation of the prism rotor 38 at a 2:1 rotation ratio to provide image de-rotation of each of the one or more optical communication channels. The principle of providing image derotation between optical signal channels by providing a derotation prism between relatively rotating beam channels, which derotation prism is geared to rotate at one half of the beam channels' speed of relative rotation is per se old, as disclosed in the hereinabove referenced commonly assigned U.S. Pat. No. 4,109,998 to M. L. Iverson, entitled "Optical Slip-rings". While planetary gearing is shown in the presently preferred embodiment, other mechanical arrangements can be used to mount the second rotating array piece and prism rotor for relative rotation without departing from the inventive concept.

It is to be appreciated that image derotation prism 36, prism rotor 38, internal ring gear 43, annular sleeve 44 and planetary gears 48 constitute an image-derotation-prism-and-prism-rotational-drive-subassembly 49 to derotate optical propagation paths across transverse rotary interfaces 20 and 30, respectively, when there is relative rotation between array pieces 12 and 26. It is to be further appreciated that the resilient bias provided by a spring 51 which is disposed between flanges 24 and 49 maintains the roller ball and V-groove thrust bearing assemblies under axial compression, so that all the localities of rotational engagement between stator 16 (including array piece 12 which is affixed thereto) and the side of prism-and-drive-subassembly 49 confronting array piece 12 and between array piece 26, are under axial (i.e., in the direction longitudinal Axis A) compressive stress. Stated another way the arrangement of thrust bearing assembly 50 and spring 51 between flanges 24 and 49 constitute a resilient means operative relative to first and second array pieces 12 and 26 and the prism-and-drive-subassembly 49 between the array pieces. This in turn renders the mechanical engagements between the sides of prism-and-drive-subassembly 49 and the confronting side of the circular race of the respective roller ball and V-groove bearing under predetermined compressive stress.

Reference is again made to FIG. 1, this time to describe in greater detail the constructions of held-together-by-adhesive sets of fiber and lens joints 18, 28; and the relationship of the sets of fiber and lens joints 18, 28 to first and second array pieces 12, 26, first and second transverse rotary interfaces 20, 30, and roller ball and V-groove assemblies 22, 32. One of the elements which forms a fiber and lens joint 18, 28 is a ferrule encased optical fiber termination FT consisting of a ferrule 19 with the axially extending marginal end portion of an optical fiber 53 extending centrally therethrough and presenting an end face of the optical fiber 53 as one of the parts of the optical joints 18. The ceramic ferrule, which is conventional and well known, provides structural support to the optical fiber termination FT and the ferrule material is chosen to enable their precision polishing as an integral unit to form a precision toleranced transverse end face. Another of the elements forming a joint 18,28 is a cylindrical-bodied-miniature-collimation-lens 54, which is mounted in a corresponding cylindrical lens receiving aperture 52 which extends between opposite sides of array pieces 12, 26. Miniature-collimation-lens 54 is a conventional component of laser light signal optical fiber communication networks. The end face of each encased-optical-fiber-termination FT is joined to the face of the corresponding miniature-collimation-lens 54 which appears at the axially inward side of the associated respective array 12 or 26, by means of optically transparent epoxy cement, diagrammatically indicated by an exaggerated bead of adhesive 55.

As is to be accounted for in greater detail later herein, fiber-encased-termination FT is butted against the face of miniature-collimation-lens 54 face. It is to be appreciated that this abutting contact provides a cooperation between the fiber and lens joints 18,28 and the optical length of the respective associated miniature-collimation lens that produces desired optical effects as follows. Miniature-collimation-lens 54 is sized in length to have a length which exceeds a quarter pitch for the wavelength of optical beam for which rotary joint 10 is designed, by a predetermined increment of longitudinal distance axially outwardly from the focal point of a collimated beam impinging upon the axially inward face of the lens. (Stated another way, such focal point of lens 54 lies within the body of the lens and the axially outward face of the lens is ground to extend such predetermined longitudinal distance axially beyond the focal point.) There is a relationship between the longitudinal spacing between the end face of each optical fiber 53 and such focal point of each respective associated miniature-collimation-lens 54 and the optical power coupled through the optical train of rotary joint assembly 10. As described later herein these longitudinal spacings are chosen to couple maximum optical power through the entire optical train of rotary joint assembly 10.

Further as is to be accounted for in greater detail later herein, in butting encased-fiber-terminations FT against the faces of their respective associated miniature-collimation-lenses 54, each encased-fiber-termination FT is individually laterally positioned relative to the fixed reference of concentricity defined by lens 54, which is rigidly supported in an aperture 52 of its supporting array piece 12 or 26. There is a relationship between the lateral positioning of the end face of each optical fiber 53 and such fixed reference of concentricity and the angle of incidence of a collimated beam at the axially inward side of miniature-collimation-lens 54 that couples with the optical fiber 53. As described later herein the lateral position of each encased-fiber-termination FT relative to the reference of concentricity defined by its respective associated miniature collimation lens 54 is chosen to cause the angle of incidence of a collimated beam which enters into, or emerges from, the axially inward side of lens 54 and which couples with the optical fiber 53 to be normal to a transverse reference plane defined by the locality of rotational engagement between the respective associated array piece 12, 26 and the confronting side of prism-and-drive-subassembly 49. It is to be appreciated that with the employment of a precision tolerances, circular-race, roller ball and V-groove thrust bearing assembly that such a reference plane can be defined by any appropriate structure of the assembly, or any appropriate structure of an array piece 12,26 which is machined to give precision support to the thrust bearing assembly.

Figure 3:
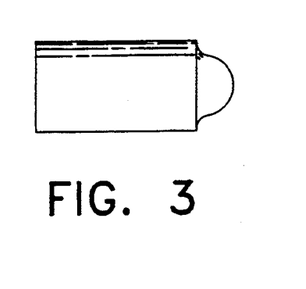
FIG. 3 is a side elevation of a type of cylindrically-bodied-collimation-lens employed in an alternate embodiment of the invention.

Each laser light signal beam which is propagated through an optical fiber 53 in the axially inward direction is coupled across the respective held-together-by-adhesive-joint of sets 18,28 and emerges from the opposite face of miniature-collimation-lens 54 as a nearly collimated beam. The nuance of the beam being nearly collimated, rather than as collimated as could be effected by lens 54, is due to the spacing between the joints 18,28 and the focal point of lens 54 being chosen for maximum coupling of optical power through the total optical train of rotary joint assembly 10, as has been described. As is generally conventional with miniature collimation lenses for optical fiber, the optical beam diameter of the nearly collimated beam emerging from lens 54 is larger than the optical beam diameter within optical fiber 53. The converse relationships and modes of operations (i.e., to produce such a nearly collimated beam) are implemented for beams propagating in axially outward direction and impinging against the axially inward face of a miniature-collimation-lens 54 and thence passing in the axially outward direction across the respective joint of sets of joints 18,28. At the axially inward side of the lenses 54, the nearly collimated beams, which may be propagating in either axial direction extend across the first and second transverse rotary interfaces 20, 30. It is to be appreciated that such coupling of the laser signal beams across interfaces 20,30 in a way which produces maximum power coupling across the total optical train of rotary joint assembly 12 contributes significantly to the result of coupling the signals with low-loss and low-crosstalk, which in turn permits the arraying of a large number of communication channels by array pieces 12, 26. The number of communication channels which an array piece may implement is essentially limited only by acceptable dimensional magnitudes of the volume envelope available for the array pieces 12, 26, and image-derotation-prism-and-rotational-drive-subassembly 49. Multi-mode step-index fiber, multi-mode graded-index, single-mode, and polarization preserving fiber may be employed. The lenses preferably are gradient index rods, such as SELFOC lenses which are supplied by the Nippon Sheet Glass Company, which has a business address at Somerset, N.J. SELFOC is a trademark of the Nippon Sheet Glass Company. However, other types of lenses which may be employed include an aspherical type miniature collimation lens, shown in FIG. 3, which features correction for spherical aberration and therefor reduces the loss associated with separation between opposing lenses.

As will become apparent in subsequent sections of the specification describing the alignment process, each axially inwardly disposed face of the body members 56, 57 of arrays 12,26 is formed with a precision tolerance planar surface 58 transverse to axis of rotation. The oblique walls of the circular V-grooves which form part of the circular races of bearing assemblies 22, 32 constitute the localities of axial engagement of array pieces 12, 26. Further as will become specifically apparent from subsequent descriptions herein of the alignment method, these localities of axial engagement define a reference plane which represents transverse rotary interfaces 20, 30 in the process of aligning the lateral position of the ferrule-encased-optical fiber-terminations FT relative to a reference of concentricity defined by the respective associated cylindrically-bodied-miniature-collimation-lenses 54.

Figure 4:
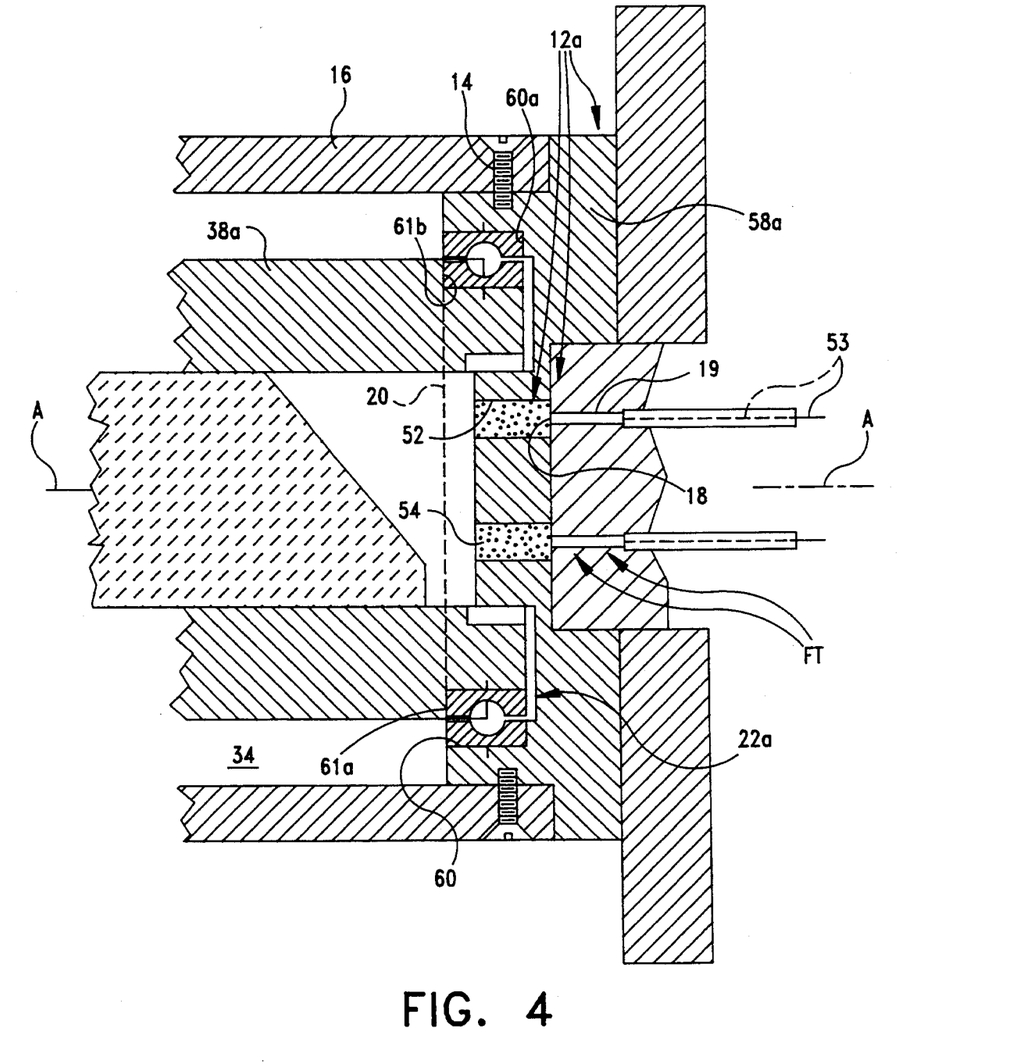
FIG. 4 is a fragmentary longitudinal sectional view like FIG. 1 illustrating a rotary-joint assembly employing an alternative embodiment of circular-race roller ball thrust bearing.

Insofar as the invention is presently understood, there is depicted in FIG. 4 an alternate embodiment which constitute the best mode of practicing the invention. Components which essentially correspond to those previously described relative to FIG. 1 are given the same reference numerals. Components which provide a like function to a corresponding component in FIG. 1 but are different, or at least represent a deliberate modification of the analogous component in FIG. 1 have been designated by the same root reference numeral as the corresponding FIG. 1 component, but with an appended suffix letter "a". The basic distinction of this alternate embodiment is that transverse rotary interfaces 20,30 (the fragmentary view shows only interface 20) are implemented by being a commercially procured circular race and roller ball thrust bearing assembly 22a, rather than the roller ball and V-groove structure of FIG. 1. Bearing assembly 22a is of a premium grade which has precision tolerance in connection with its dimensions. The body member 58a of array piece 12a is configured to form axially extending cylindrical bore surface 60 and a shoulder 60a with precision tolerances. The outer race of bearing assembly 22a is force fitted within bore surface 60 and butting against shoulder 60a. Prism rotor 38a has formed thereon at its adjacent marginal end portion a reduced diameter axially extending cylindrical surface 61a which at its axially inward end terminates at a shoulder 61b. The latter shoulder 61b is also formed with precision tolerances as a transverse planar surface. It is to be appreciated that for purposes of the later herein described process of lateral positioning of each encased fiber-termination FT relative to the reference of concentricity defined by the respective associated cylindrically-bodied-miniature-collimation-lens 54, the axially inward edge of the inner race of assembly 22a constitutes the locality of axial engagement (being in contact with shoulder 61b).

The aforesaid choices of (i) the longitudinal space between the end face of each optical fiber 53 and the focal point of the respective associated miniature-collimation lens 54 (for a collimated beam impinging the axially inward face of lens), and (ii) lateral position of such optical fiber end face relative to a reference of concentricity defined by lens 54) are determined in that order. That is to say the longitudinal spacing should be determined first and the lateral position should be determined thereafter.

The following is illustrative of a technique for determining longitudinal spacing of the optical fiber end face and lens focal point, which is appropriate where a gradient index rod type miniature collimation lens 54 is employed. This type of lens is cylindrical in shape and performs all bending of the light by its index variation rather than by a shaped surface. An underlying premise to this technique is that the wavelength of the optical fiber beam of the application for which rotary joint assembly 10 will be used is known. The aforesaid type of miniature-collimation-lens 54 may be procured in pre-sized lengths longer than a quarter pitch of this wavelength laser signal to be passed through rotary joint assembly 10 by an amount that results in the focal point for a collimated beam impinging one of its faces to be located within the body of the presized lens at its other end.

The essence of the procedure is to polish a face of a miniature-collimation-lens 54 to reduce its length, so that when a ferrule-encased-fiber termination FT is butted thereagainst it, the end face of the optical fiber will be at a an axial position leaving the focal point of lens 54 axially inwardly spaced therefrom by the distance resulting in couplement of maximum optical power through the entire optical train of rotary joint assembly 10. However, a factor to consider in implementing this practice is variations between individual gradient index, rod type lenses. In their manufacture they are processed in batches. The batch-to-batch fabrication tolerances have been found not sufficiently consistent to predict a post-polishing length to give the optimum coupling which could be applied between different manufacturing batches. However, within any given lens manufacture process batch the consistency has been found sufficient that a post-polished length may be empirically determined by "cut and try" for sample lenses is from the batch. This empirically determined length will have applicability to the entire batch.

Accordingly, a pair of pre-sized lenses of the batch are employed as batch calibration samples to determine a post-polishing re-sized lens length which will cause an abutting encased-fiber-termination FT to be at the axial (or longitudinal) position producing the maximum power coupling. More specifically this is done by polishing the pair of the pre-sized lenses to various lengths and measuring the optimum coupling through the optical train of rotary joint assembly which is achievable at each lens length with encased-fiber-terminations FT butted to the lenses. Still more specifically, the pair of calibration sample lenses are polished to matching equal lengths, measured by a micrometer. Encased-fiber-terminations FT are then individually attached to corresponding individual sample lenses with optical epoxy such that the end face of the encased-fiber-terminations FT abut the face of the corresponding lens with the fiber approximately concentric with the lens. In effect, this provides a matched pair of calibration samples of held-together-by-adhesive fiber and lens joints 18. The pair of calibration samples of joints 18 are then mounted in an optical bench in a relation of bilateral symmetry to one another (mirror image relationship), separated by a distance corresponding to the optical length of the propagation path between transverse rotary interfaces 20, 30 (i.e., through derotation prism 36) to simulate the optical train of rotary joint assembly 10. Using the capabilities of the optical bench, the angular alignment between the individual samples is fine tuned to achieve maximum coupling between the fibers. The optical loss at maximum coupling is recorded. The fibers are then removed from the lenses and the lenses cleaned with a solvent to remove the epoxy. The lenses are polished to a new shorter length and the process is repeated. Through a succession of like steps a plot of optical loss versus lens length is obtained, for each batch of lenses. This plot is then interpreted to determine the re-sized length of the lenses of the batch which results in minimum optical loss when a fiber end portion is abutted against the lens face. Other of the pre-sized lenses of the batch may be prepared for use as lenses 54 in rotary joint assembly 10 by polishing them to this optimum length.

It will be appreciated that in accordance with the aforesaid practice the preselected axial (or longitudinal) position of the end face of an encased-fiber-termination FT is a single-coordinate location along a linear reference axis (not shown) relative to the focal point at the axially outward side of the miniature-collimation-lens 54. Moreover, in terms of geometric relationships, this longitudinal reference axis (not shown) is co-parallel with Axis A of rotary joint assembly 10. That is, by virtue of determining the re-sized length of the lens employing the aforesaid described optical bench simulation set up, one simulates the entire optical train of assembly 10 so that the set up inherently has an axis that corresponds to Axis A.

It is to be appreciated that positioning encased-fiber-termination FT axially outwardly beyond the focal point of the associated miniature-collimation-lens 54 has a basis in theory. It can be shown that when using expanded beam coupling, where two optical fibers are coupled by use of two miniature-collimation lenses in a bilaterally symmetrical arrangement, the maximum degree of coupling is not achieved when the fiber faces are located at the lens focal points. (On the other hand, optimum imaging of the first fiber face onto the second face would dictate that the fiber faces should be located at the focal point, and thus would provide a strictly collimated beam between the lenses.) However, the objective in an optical fiber optic connection in a laser-light signal fiber optic communication channel is to couple a maximum amount of optical power and not to maintain an optimum image. It can also be shown, using a Gaussian beam optics formalism, that in a bilaterally symmetric arrangement of optical fibers and miniature-collimation-lenses, the longitudinal position for the fibers relative to the lenses which gives optimal coupling is a position slightly spaced axially outwardly beyond the focal point. This additional distance is dependent upon the separation between the two lenses. The further the space between transverse rotary interfaces 20 and 30, the further the end faces of the fibers are required to be beyond the focal points of the lenses. It will be appreciated that in an arrangement to provide maximum coupling, the resultant beam will not strictly be a collimated beam. However, it will be "nearly collimated beam".

Figure 5:
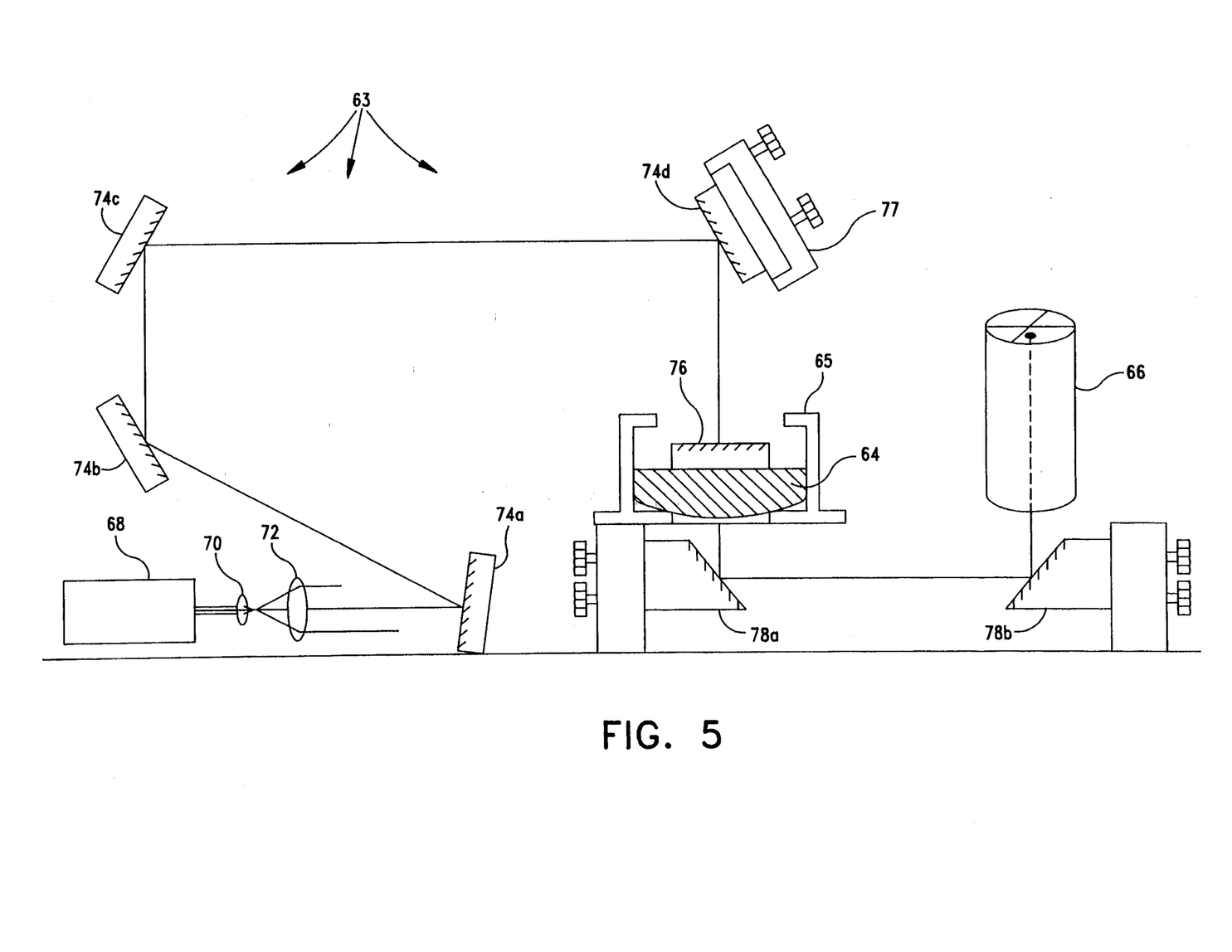
FIG. 5 is a diagrammatic view of a configuration of optical bench type apparatus employed in a procedure for producing the present invention, and more particularly during a calibration phase of the procedure.
Figure 6:
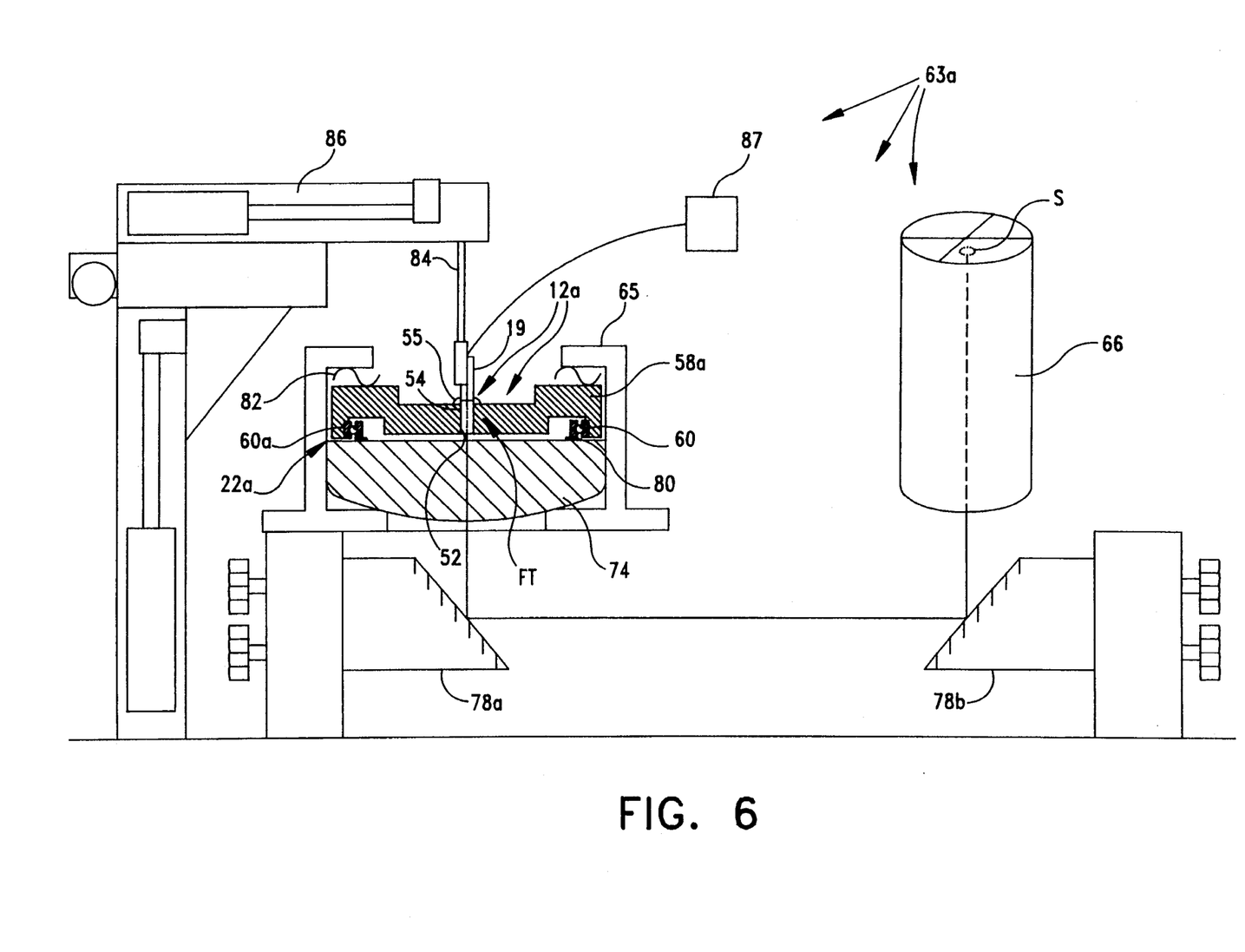
FIG. 6 is partially a diagrammatic view, with a part thereof a longitudinal section of the optical bench apparatus of FIG. 5 during a phase of the procedure for laterally positioning a fiber termination relative to a cylindrically bodied collimation lens.

Reference is now made to FIGS. 5 and 6 for a an illustrative technique for determining the lateral position of the end face of optical fiber 53 relative to a reference of concentricity defined by the miniature-collimation-lens 54 at a joint 18 therewith. FIG. 5 depicts a calibration process (which is performed upon an optical bench set up 63 in establishing a base-line reference optical train therethrough (i.e., bore-sighting the optical train of optical bench set up 63). FIG. 6 illustrates the optical bench set up 63a used in the technique of joining the encased-fiber-terminations FT with their respective associated miniature-collimation-lenses 54 while the latter are fixedly disposed in the apertures 52 of array pieces 12, 26. (The encased-fiber-terminations FT are cemented to lenses 54 prior to the final assembly of array pieces, or end subassemblies, 12,26 with the other components into a rotary joint assembly 10.)

Referring again to FIG. 5, it is necessary to bore-sight bench set up 63 so that any collimated light beam which is precisely perpendicular to the planar surface of the plano-convex lens 64 held by a fixture 65 will form a substantially focused spot on the center of cross-hairs on an infrared and visible light sensitive display screen 66 which is located substantially at the focal point on the convex side of lens 64. A beam from a visible light laser 68 is expanded to a larger diameter beam by a train of two lens 70 and 72. This expansion is done to reduce the divergence angle of the beam. The beam is directed over a considerable distance by a train of mirrors 74a, 74b, 74c, and 74d, to impinge upon a partial mirror 76. Mirrors 74a, etc., are optional and function solely to fold the long optical path into a reasonable size room. Partial mirror 76 is manufactured with precise parallelism between its two faces. Thus as it rests on plano-convex lens 64, the upper surface of partial mirror 76 is precisely parallel to the planar surface of plano-convex lens 64. The laser beam is reflected from partial mirror 76. A two-axis mirror mount 77 is used to tilt mirror 74d to cause the laser beam to strike the partial mirror 76 precisely perpendicular to its upper mirrored surface. When the laser beam and the surface of partial mirror 76 are precisely perpendicular, the laser beam is retro-reflected so that it traces the same path back to the laser 68. The coincidence of the outgoing and reflected beams in the vicinity of lenses 70 and 72 is the evidence that perpendicularity of beam and partial mirror surface 76 has been achieved. Usually the normal environmental dust on lenses 70 and 72 causes sufficient scattering of light to enable the position where the beams strike the lenses to be seen with the unaided eye. Otherwise a card with a hole in it may be used near lens 72 to pass the outgoing beam and view the reflected beam. Mirror mount 77 is adjusted until the spot due to the reflected beam overlaps the spot from the outgoing beam.

Once the laser beam is perpendicular to the surface of the partial mirror 76, and hence by virtue of parallelism of the opposite faces of partial mirror 76 is perpendicular to the planar surface of the lens 64, the portion of the beam which passes through the partial mirror is focused by the plano-convex lens upon viewing screen 66. A pair of orthogonally disposed two-axis mirrors 78a and 78b are tilted so that the focused spot on the screen is centered on cross-hairs or any other suitable target. As will become apparent, the cross-hairs now constitute a rotary-joint-assembly-optical-trains-alignment target. This completes the establishment of a base-line reference optical train through optical bench set-up 63 (or more simply stated bore-sights the set up).

Reference is now made to FIG. 6 for the optical elements assembly process directly involving determination of the preselected lateral position of the each ferrule encased fiber termination relative to the collimation lens 54 to which it is to be joined. FIG. 6 depicts a portion 63a of the previous optical bench set up (63, FIG. 5) which is employed for this practice. The formerly shown partial mirror (76, FIG. 5) which rested in the plano-convex lens 64 during the calibration practice is replaced by array piece 12a, FIG. 4 (i.e., of the embodiment identified as the inventor's best mode of invention). However, for purposes of clarity of discussion of concepts, the array piece 12a in FIG. 6 is depicted in a somewhat simplified form. Specifically, only a single lens receiving aperture 52 is shown extending through array piece 12a, it being understood that in multiple channel rotary joint assembly 10, the array piece is provided with a set of more than one lens receiving apertures 52. The outer race of circular-race and roller ball bearing assembly 22a is assembled to array piece 12a with a force fit against with reference alignment cylindrical bore surface 60 and in abutting engagement against shoulder 60a. The inner race rests on a small spacer 80 which in turn rests on the plano-convex lens 74. A spring 82 serves as a resilient force acting upon array 12a in a direction which after assembly of array 12a within rotary joint assembly 10, FIG. I will correspond to the axial direction of force exerted by the spring 51 FIG. 1 of assembly 10. The spring 82 (i) seats ball bearing assembly 22a against spacer 80, and (ii) also seats spacer 80 against the planar surface of lens 74. Optical fiber 53 is conventionally epoxyed into a ferrule 19 and the end face of this subassembly is conventionally polished. Ferrule 19 is held in a holder 84 attached to the three-axis stage 86. Stage 86 is used to move the ferrule-encased-optical-fiber-termination FT until its polished face is butted to the face of miniature-collimation-lens 54, completing the longitudinal alignment and enabling the start of the lateral alignment. A modicum of slack is provided in butting the fiber termination FT against lens 54, to accommodate subsequent lateral positioning of the fiber termination. The previously applied optically transparent epoxy between the fiber termination FT and lens 54 acts as a lubricant during subsequent lateral movement. A laser 87 that emits approximately at the design wavelength of rotary joint assembly 10 has its beam coupled into the fiber 53. This light is guided to the miniature lens 54, from which it is emitted as a nearly collimated beam. This beam is focussed by the plano-convex lens to a spot S at viewing screen 66. The three-axis stage 86 is used to align fiber ferrule 19 (and in turn fiber termination FT) in two axes which are transverse to the axis of the miniature collimation lens 54. This transverse alignment of the encased-fiber-termination FT changes the angle at which the beam exits miniature collimation lens 54, and in turn changes the location of the spot S on screen 66. The encased-fiber-termination FT is swept along the surface of the face of lens 54 (aided by the lubricating effect of the epoxy cement which is still in liquid state) until spot S is in registry with, or centered in, the cross-hairs (or rotary joint assembly optical trains alignment target) on the screen 66. At that time the beam exiting the miniature lens 54 is precisely perpendicular to the planar surface of the plano-convex lens 74, and hence to the abutting surface of the inner circular-race of roller ball bearing assembly 22a. The engagement between the inner circular race of bearing assembly 22a and the planar surface of lens 74 (structurally buffered by spacer 80) constitutes the locality of axial engagement between the array piece 12a and such planar surface. This locality of axial engagement in turn defines a transverse reference plane representing transverse rotary interface 20. It will be appreciated that by adjusting two axes of three-axis stage 86 the encased fiber termination is located at a position defined by coordinates of a two-dimensional reference set of coordinates lying in a plane perpendicular to Axis A of assembly 10 after array piece 12a is assembled within rotary joint assembly 10. It will be further appreciated that this position causes beams which couple between the axially inward face of collimation lens 54 and derotation prism 36 to enter or exit the axially inward face of collimation lens 54 to be perpendicular to transverse rotary interface 20. The epoxy is allowed to harden.

The heretofore disclosed embodiments of the invention have featured an embodiment in which the ferrule-encased-fiber terminations FT have butted against the lens face of the miniature collimation lens 54 to which joined, with the length of lens 54 such that the preselected longitudinal position for optimum coupling of power is located at the lens face. However, it is to be understood that the principles of the invention also apply where the preselected longitudinal position is axially outwardly beyond the face of lens 54 and the end face of encased fiber termination FT is spaced from the face of lens 54. In fact, it has been found that the distance between a miniature lens's focal point and the preselected position axially outwardly therebeyond is sufficiently small to enable joining an encased-fiber-termination FT to the face of the lens 54 with the proper space therebetween to locate the face at such position axially outward of the focal length by flowing optical epoxy therebetween, and allowing same to harden. Rather than the above-described "cut and try" process to determine resized collimation lens length in the instance the desired longitudinal position of the end face of the encased-fiber-termination would be determined by an optical bench process employing back reflection with a beam splitter tapping into the beam where it includes the back reflected component. The split off portion of the beam is directed to a photodetecting power measurement device. The bench would be set up to simulate the bilaterally symmetrical arrangement of a pair of held-together-by-adhesive fiber and lens joints 18 separated by an optical distance equal to that between transverse rotary interfaces 20 and 30. (The encased-fiber-termination FT of each joint would be mounted on one and the other of a pair of axially adjustable lens stages, and with their bilaterally symmetrical positions providing optimum beam coupling empirically determined by bilaterally symmetrically sweeping the axial positions of the pair of stages to find positions at which the photo-detecting device indicates the split off beam power is optimum.

Many other modifications of the presently disclosed invention will become apparent to those skilled in the art without departing from the scope of the instant invention.

What is claimed is:

1. A fiber optic rotary joint apparatus comprising:
   a stator defining a longitudinal axis of rotation;
   a first lens housing member for receiving at least one cylindrically-bodied-miniature-collimation-lens, said first housing member being fixedly mounted to the stator and constructed and arranged with precision tolerances to define an axially inwardly disposed locality of axial engagement which in turn defines a first transverse reference pseudo-planar rotary interface of the rotary joint;
   a second lens housing member for receiving at least one cylindrically-bodied-miniature-collimation-lens but configured with axial bilateral symmetry with respect to the first lens housing member, said second lens housing member being constructed and arranged with precision tolerances to define an axially inwardly disposed locality of axial engagement which in turn defines a second transverse reference pseudo-planar rotary interface of the rotary joint;
   an image-derotation-prism-and-prism-rotational-drive-subassembly including an image-derotation-prism which is optically aligned along the longitudinal axis and disposed between the first and second lens housing members with its opposite sides in engagement with the locality of axial engagement of the confronting lens housing member;
   first means for mounting the second lens housing member to the stator for rotation relative thereto about the longitudinal axis;
   second means for mounting the image-derotation-prism-and-prism-rotational-drive-subassembly to the stator;
   said image-derotation-prism-and-prism-rotational-drive-subassembly and said second means for mounting being so constructed and arranged that the image-derotation-prism will be rotated about the longitudinal axis at a predetermined ratio of rate of rotation relative to the rate of rotation of the second lens housing member about said axis; and
   a ferrule-encased-optical-fiber-termination attached to the axially outward side of each cylindrically-bodied-miniature-collimation lens at a predetermined axial position so chosen that substantially a maximum amount of power of an optical fiber signal beam is coupled through the first corresponding miniature collimation lenses in the first and second lens housing members and through the image-derotation-prism therebetween, the predetermined axial positions of the fiber-terminations attached to corresponding miniature lenses in one end and the other of the first and second lens housing members being in axial bilateral symmetrical relationship to one another, each fiber-termination being at a predetermined lateral position with respect to the miniature-collimation-lens so chosen that it couples with a beam propagation path at the radially inwardly disposed side of the miniature-collimation-lens perpendicular to the corresponding transverse reference pseudo-planar rotary interface.

2. Fiber optic rotary joint apparatus in accordance with claim 1 wherein the lateral position of the attachment of each ferrule-encased-optical-fiber-termination to the axially outwardly facing side of the corresponding cylindrically-bodied-miniature-collimation-lens is defined by two coordinates of a two-dimensional reference coordinate system lying in a reference plane perpendicular to the longitudinal axis.

3. Fiber optic rotary joint apparatus in accordance with claim 1 wherein the optical aperture of each cylindrically-bodied-miniature-collimation-lens is larger than the optical aperture of the ferrule-encased-optical-fiber-termination attached to the axially outwardly disposed lens face of the former.

4. Fiber optic rotary joint apparatus in accordance with claim 1 which is a multiple optical fiber channel joint wherein each lens housing member is for receiving at least two cylindrically-bodied-miniature-collimation lenses and at least one of the miniature-collimation-lenses mounted to the lens housing member is radially outwardly disposed from the rotary joint longitudinal axis with its optical axis co-parallel therewith.

5. Fiber optic rotary joint apparatus in accordance with claim 4, wherein the image-derotation-prism is a dove-type prism.

6. Fiber optic rotary joint apparatus in accordance with claim 1 wherein the ferrule-encased-optical-fiber-termination is the termination of a single-mode type optical fiber.

7. Fiber optic rotary joint apparatus in accordance with claim 1 wherein said ferrule-encased-optical-fiber termination is the termination of a multiple mode type optical fiber.

8. Fiber optic rotary joint apparatus in accordance with claim 1 wherein said ferrule-encased-optical-fiber termination is attached to the lens face of the cylindrically-bodied-miniature-collimation lens by means of an optical transparent adhesive medium.

9. Fiber optic rotary joint apparatus in accordance with claim 1 wherein said cylindrically-bodied-miniature-collimation-lens is of the index-graded rod type.

10. Fiber optic rotary joint apparatus in accordance with claim 9 wherein:
    each cylindrically-bodied-miniature-collimation-lens is sized such that the predetermined axial position lies along the radially outwardly disposed face of the lens; and
    each corresponding ferrule-encased-optical-fiber-termination is attached to said face of the lens in abutting relationship thereto.

11. Fiber optic rotary joint apparatus in accordance with claim 1, and:
    resilient means operative upon the first and second lens housing members and the image-derotation-prism-and-prism-rotational-drive-subassembly to maintain the localities of axial engagement between the lens housing members and the respective adjacent sides of prism and rotational drive subassemblies under compressive stress.

12. Fiber optic rotary joint apparatus in accordance with claim 1, wherein:

each lens housing member includes a body portion and a precision tolerances circular race roller ball bearing assembly transversely and concentrically disposed relative to the longitudinal axis;

the body portion of each lens housing member forming a source of precision transverse tolerances reference surface at its axially inward side; and the construction and arrangement of each lens housing member being such that the axially outwardly disposed portion of the circular race is intimately precision aligned with the said source of precision transverse tolerances reference surface and the axially outwardly disposed portion of the circular race forms the aforesaid locality of axial engagement defined by the lens housing member, 13. Fiber optic rotary joint apparatus in accordance with claim 12, wherein:

resilient means operative upon the first and second lens housing members and upon the image-derotation-prism-ad-prism -rotational-drive subassembly therebetween to maintain the axially outwardly disposed portions of the circular races of the respective lens housing members under compressive stress, whereby precisional tolerance as between relatively moving parts are enhanced.

14. Fiber optic rotary joint apparatus in accordance with claim 1, wherein said image-derotation-prism-and-prism-rotational drive subassembly includes a planetary gear subassembly having an internal ring gear mounted for rotation with the image-derotation-prism, a star gear mounted for rotation with the second lens housing member, and a plurality of planetary gears journalized to the stator between and mechanically ganged with said star gear and said internal ring gear.

15. Fiber optic rotary joint apparatus in accordance with claim 1 wherein said predetermined ratio of rate of rotation of the image-derotation-prism relative to the rate of rotation of the second lens housing member is 2:1.

* * * * *